(12) United States Patent
Sun et al.

(10) Patent No.: US 8,152,178 B2
(45) Date of Patent: Apr. 10, 2012

(54) WHEEL CHASSIS AND SHOPPING BAG WITH DETACHABLE WHEEL CHASSIS

(76) Inventors: Wai Lun Alan Sun, Lantau (HK); Bit Shing Victor Sun, Lantau (HK)

( * ) Notice: Subject to any disclaimer, the term of this patent is extended or adjusted under 35 U.S.C. 154(b) by 318 days.

(21) Appl. No.: 12/555,201

(22) Filed: Sep. 8, 2009

(65) Prior Publication Data

US 2010/0001030 A1    Jan. 7, 2010

Related U.S. Application Data

(63) Continuation-in-part of application No. 12/055,394, filed on Mar. 26, 2008, now abandoned.

(30) Foreign Application Priority Data

Nov. 30, 2007 (HK) .................................. 07113150

(51) Int. Cl.
*B62B 3/02* (2006.01)
*B62B 7/06* (2006.01)

(52) U.S. Cl. ......... 280/35; 280/40; 280/651; 280/79.11; 280/43.24; 280/47.131; 280/47.24; 280/47.33

(58) Field of Classification Search ............ 280/35, 280/639, 37, 38, 40, 644, 651, 43.1, 79.11, 280/43.24, 47.131, 47.18, 47.24, 47.26, 47.33, 280/79.2

See application file for complete search history.

(56) References Cited

U.S. PATENT DOCUMENTS

| | | | | |
|---|---|---|---|---|
| 3,752,494 A | * | 8/1973 | Dunn | 280/47.26 |
| 3,774,931 A | * | 11/1973 | Stelniceanu | 280/47.24 |
| 3,804,432 A | * | 4/1974 | Lehrman | 280/654 |
| 3,934,895 A | * | 1/1976 | Fox | 280/47.26 |
| 4,274,645 A | * | 6/1981 | Ferguson et al. | 280/47.26 |
| 4,596,397 A | * | 6/1986 | Conti | 280/47.131 |
| 5,131,670 A | * | 7/1992 | Clements et al. | 280/35 |
| 5,338,054 A | * | 8/1994 | Imai et al. | 280/655 |
| 5,489,107 A | * | 2/1996 | Kho | 280/47.131 |
| 6,293,569 B1 | | 9/2001 | Ferre et al. | |
| 6,454,293 B1 | * | 9/2002 | Anderson | 280/651 |
| 6,513,816 B1 | * | 2/2003 | Kijima | 280/47.26 |
| 6,554,299 B1 | * | 4/2003 | Bartos | 280/47.26 |
| 6,585,274 B2 | * | 7/2003 | Sawyer | 280/37 |
| 6,666,465 B2 | * | 12/2003 | Chan | 280/47.26 |
| 6,880,851 B1 | * | 4/2005 | Summers et al. | 280/652 |

(Continued)

FOREIGN PATENT DOCUMENTS

CN        2572814 Y       9/2003

(Continued)

*Primary Examiner* — John R Olszewski
(74) *Attorney, Agent, or Firm* — Rabin & Berdo, P.C.

(57) ABSTRACT

The present invention relates to a shopping bag with a detachable wheel chassis, comprising a bag body having bag handles and a receiving portion disposed on its bottom, and a two-wheel chassis detachably configured to bear and hold the bag body thereon. The chassis is made of a piece of resilient metal wire and has a configuration having a downwardly extended supporting portion, two oppositely and inwardly inserting portions adapted to be received in the receiving portion of the bag body, and two end portions on which the two wheels are rotatably mounted. The shopping bag of the invention is convenient to use, low in cost, simple in structure, and also finds a wide range of applications. The invention also provides a two-wheel chassis detachably configured to bear and hold an article having a relatively flat bottom and a receiving portion on the flat bottom.

21 Claims, 8 Drawing Sheets

U.S. PATENT DOCUMENTS

| | | | |
|---|---|---|---|
| 7,617,956 B1* | 11/2009 | Sabbah | 224/153 |
| 2002/0017767 A1* | 2/2002 | Sawyer | 280/37 |
| 2002/0084629 A1* | 7/2002 | Levy et al. | 280/651 |
| 2003/0034636 A1* | 2/2003 | Ng | 280/652 |
| 2003/0038008 A1* | 2/2003 | Han | 190/115 |
| 2004/0084880 A1* | 5/2004 | Kim | 280/652 |
| 2005/0103589 A1* | 5/2005 | Russo et al. | 190/18 A |
| 2006/0226619 A1* | 10/2006 | Sadow | 280/47.26 |
| 2007/0035098 A1* | 2/2007 | Moore | 280/79.2 |

FOREIGN PATENT DOCUMENTS

| | | |
|---|---|---|
| CN | 201213530 Y | 4/2009 |
| CN | 201216271 Y | 4/2009 |
| GB | 2444596 A | 6/2008 |

\* cited by examiner

WHEEL CHASSIS AND SHOPPING BAG WITH DETACHABLE WHEEL CHASSIS

CROSS REFERENCE OF RELEVANT APPLICATION

This application is a continuation-in-part application of U.S. patent application Ser. No. 12/055,394 filed on Mar. 26, 2008 and entitled "a shopping bag with detachable wheel chassis", the disclosure of which is hereby incorporated in its entity for reference.

FIELD OF THE INVENTION

The present invention relates to an improvement on a shopping bag, more specifically, to a shopping bag with a detachable wheel chassis which is cost effective, labor-saving and much more convenient. The present invention also relates to such a wheel chassis.

BACKGROUND OF THE INVENTION

While attending a large exhibition or a convention, or visiting a shopping mall, a visitor or a customer needs a hand-held shopping bag to carry out materials such as advertising documents or purchased items. But when the materials have been accumulated in the shopping bag, it is not convenient for the visitor or the customer to carry the shopping bag. Thus, there is a need for a shopping bag which is not only convenient but also labor-saving. For this purpose, attempts to design such a shopping bag have been made in the past. For example, U.S. Pat. No. 6,293,569 has disclosed a mobile shopping bag assembly that is distinct from conventional bag carriers. Although this kind of bag can address the problem by means of wheel assembly mounted at the bottom of the bag and is labor saving, such a bag still suffers from the drawbacks below:

(1) the wheels assembly requires to puncture through the bottom end of the bag, which inevitably cause a damage to the integrity of the bag body;

(2) the assembly needs a platform insert made of plastic material to be placed in the bag, but a complicated injection molding process is required to form the platform insert, and therefore would be a difficulty for mass production in terms of production time and cost; and (3) it takes long time to assemble the bag of this patent because one can only insert one wheel at a time, while this bag is designed to have as many as 4 castor wheels.

As a result, the shopping bag assembly disclosed in U.S. Pat. No. 6,293,569 may be commercially undesirable.

U.S. patent application Ser. No. 12/055,394 was filed by the present applicant to claim a shopping bag with a detachable wheel chassis, which comprises a bag body having bag handles and a wheel chassis connected with the shopping bag body in an inserting manner. Said wheel chassis includes a shaft, two wheels rotatably mounted on two ends of the shaft by means of fixing elements, and a supporting assembly arranged on the shaft including a supporting rod, two convex supporting members and a bracket. This shopping bag is characterized by the fact that the bag body is provided with a receiving portion on its bottom and an inserting element detachably disposed in the receiving portion of the bag body. Although this bag is satisfactory to a great extent, it still has drawbacks that the entire structure of the wheel chassis is somewhat complicated, and the inserting element and the bracket need to be fastened by an additional soldering process. In addition, the wheel chassis is adapted to limited types of shopping bags only, because the change of the inserting element cannot be effected.

There is a need for simplifying the wheel chassis and eliminating the need of soldering process. A new shopping bag has been developed which is low in cost, convenient to use and simple in configuration.

SUMMARY OF THE INVENTION

An object of the invention is to provide a shopping bag with a detachable wheel chassis which does not require any soldering process for making the wheel chassis and which is not only able to provide the convenience to use and find a wide range of applications, but also is low in manufacturing cost and complexity.

The object of the invention is achieved by providing a shopping bag, which comprises a bag body having bag handles and a receiving portion disposed on the bottom of the bag body; and a two-wheel chassis detachably configured to bear and hold the bag body on the chassis, wherein the chassis is made of a piece of resilient metal wire and has a configuration having a downwardly extended supporting portion, two oppositely and inwardly inserting portions adapted to be received in the receiving portion of the bag body, and two end portions on which the two wheels are rotatably mounted.

To assemble the bag body and the two-wheel chassis, the inserting portions are inserted into the receiving portion of the bag body. In a preferred embodiment, the receiving portion is an insert-receiving member fixed onto the bottom of the bag body. The receiving portion defines a receiving space between a part of the bottom of the bag body and the insert-receiving member to form an insert-receiving pocket with two open ends for receiving the inserting portions of the chassis. In this way, assembly of the shopping bag of the invention is accomplished by simply inserting the inserting portions into the insert-receiving pocket.

The chassis which bears the bag body is made of a piece of resilient metal wire and manufactured to have a configuration having a downwardly extended supporting portion, two oppositely and inwardly inserting portions adapted to be received in the receiving portion of the bag body, and two end portions on which the two wheels are rotatably mounted. Iron wire may be used as the resilient metal wire for the sake of cost efficiency. Of course, other metal wires such as stainless steel wire or PVC-coated wire are possible.

In one preferred embodiment of the invention, the metal wire is of a substantially V-shaped configuration and has a middle part that is oppositely and inwardly curved to form two inserting portions of the chassis, and each of the inserting portions can be fully inserted from the corresponding open end into the receiving portion disposed on the bottom of the bag body and be held snugly in the receiving portion. The V-shaped configuration further has a downwardly extended convex supporting portion, and two downwardly and outwardly extended end portions on which the two wheels are rotatably mounted.

In another preferred embodiment, the metal wire is of a substantially rectangular configuration and has a downwardly extended supporting portion of rectangular shape, two oppositely and inwardly curved inserting portions, and two downwardly and inwardly extended end portions on which the two wheels are rotatably mounted.

An advantageous feature of the invention is that the inserting portions are shaped and sized manually so as to be received in the insert-receiving member snugly.

Another advantageous feature of the invention is that a protection layer, such as a plastic layer, is wrapped onto the supporting portion to protect a smooth floor from being scratched when the shopping bag is used. Preferably, the plastic layer is made of PVC. As an alternative, a plastic or foam tube can be sleeved on the supporting portion to provide the same protection.

A yet advantageous feature of the invention is that the insert-receiving member is fixed onto the bottom of the bags of different sizes, allowing a chassis of one standard size can be adapted to suit for various types of shopping bags of the different sizes.

According to the invention, no welding is required for manufacturing the chassis because the chassis is completely made of a piece of resilient metal wire. In addition, the supporting portion and the two wheels can be arranged on the same level, allowing the shopping bag of the invention to stay immovable even on a smooth floor.

BRIEF DESCRIPTION OF THE DRAWINGS

A further detailed description of the invention will be made with reference to the accompanying drawings, the foregoing and other objects, features, aspects and advantages of the present invention will become more apparent from the detailed description in conjunction with the accompanying drawings; wherein.

DETAILED DESCRIPTION OF THE PREFERRED EMBODIMENT

Figure 1:
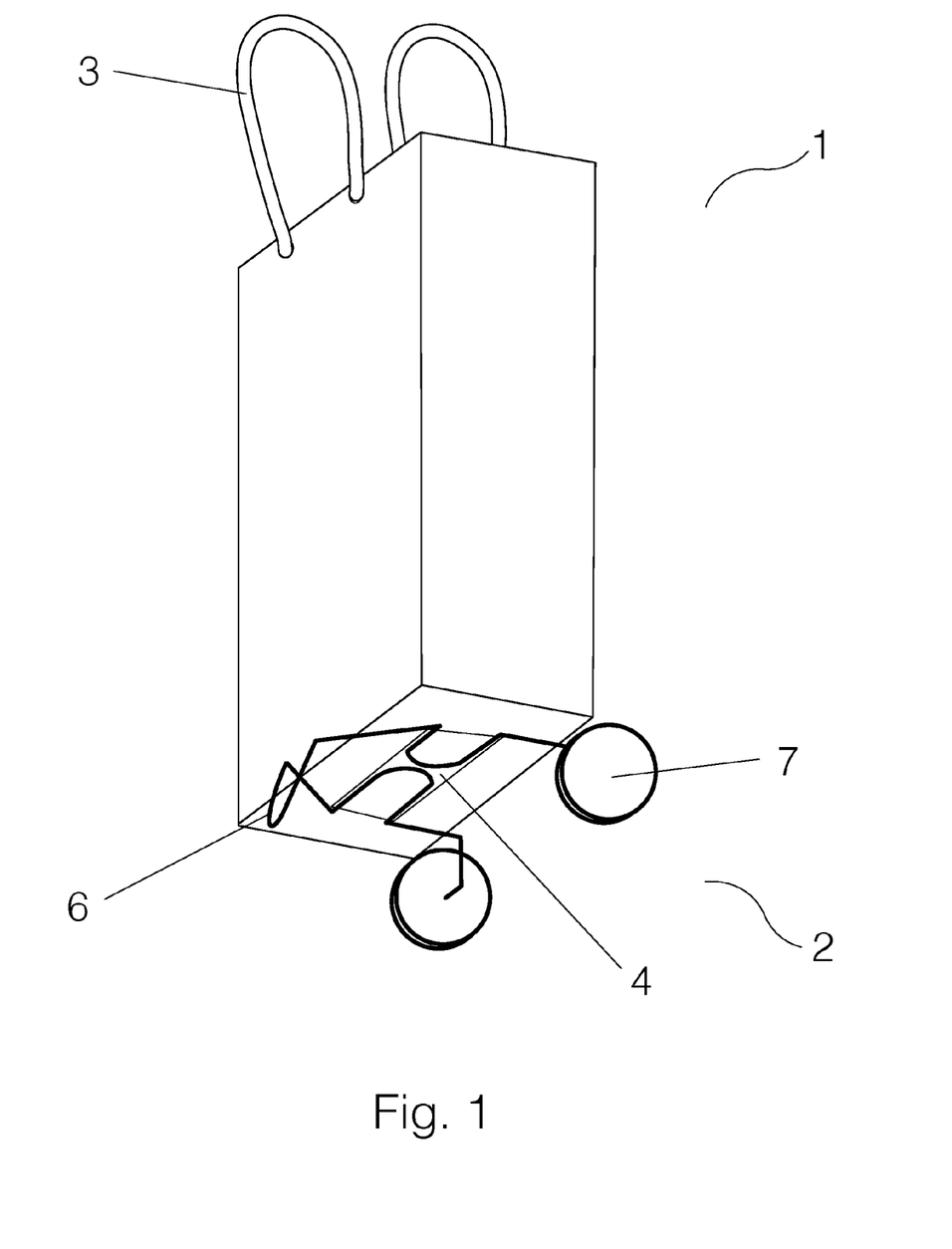
FIG. 1 is a perspective view showing a shopping bag of the present invention with inserting portions being inserted into a bag body of the shopping bag.

Referring to FIG. 1, a shopping bag with a detachable two-wheel chassis constructed according to one embodiment of the invention is shown. The shopping bag comprises a bag body 1 having two handles 3 and a two-wheel chassis 2. The bag body 1 may be made from a material selected from non-woven fabric, paper, plastic or other materials known in the art. Preferably, the bag body 1 of the embodiment is made of paper. It is understood that the handles 3 of the bag body 1 should be long enough to allow convenient and easy dragging of the shopping bag.

Figure 2:
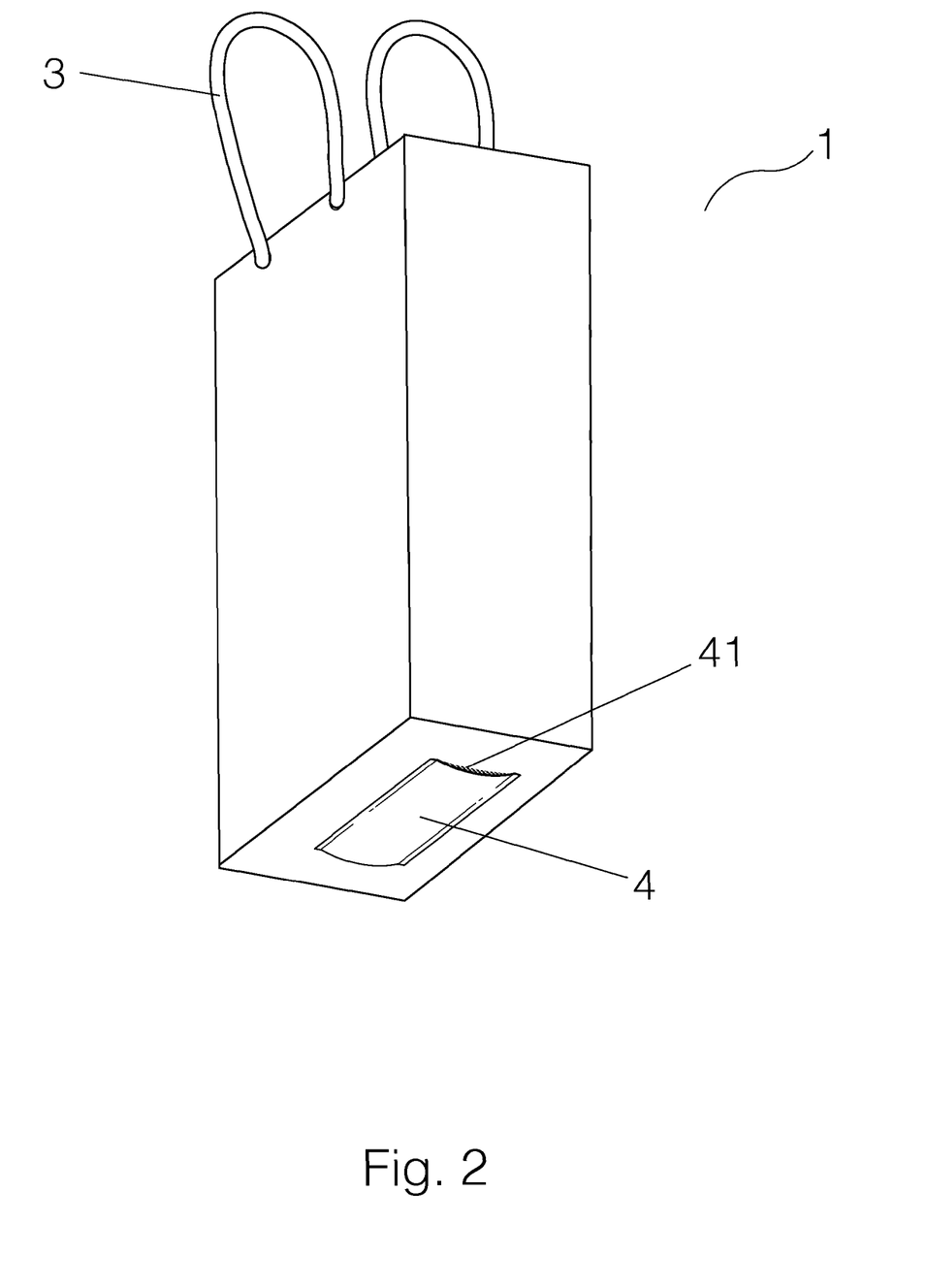
FIG. 2 is a schematic view of an insert-receiving pocket with two open ends formed at the bottom of the bag body of the shopping bag.

As shown in FIG. 2, a receiving portion 4 is provided on the bottom of the bag body 1. Preferably, said receiving portion 4 is an insert-receiving member fixed onto the bottom of the bag body 1 by an adhesive, staples, sewing or the like. In this way, the receiving portion 4 would define a receiving space between a part of the bottom of the bag body 1 and the insert-receiving member to form an insert-receiving pocket 41 with two open ends for receiving the inserting portions. Generally, the receiving portion 4 is a pocket which can be fixed instantly onto the bottom of the bag through adhesive in the case that the shopping bag is made of a paper or plastic material, or in a sewing manner in the case that the shopping bag is made of a fabric material.

Figure 3:
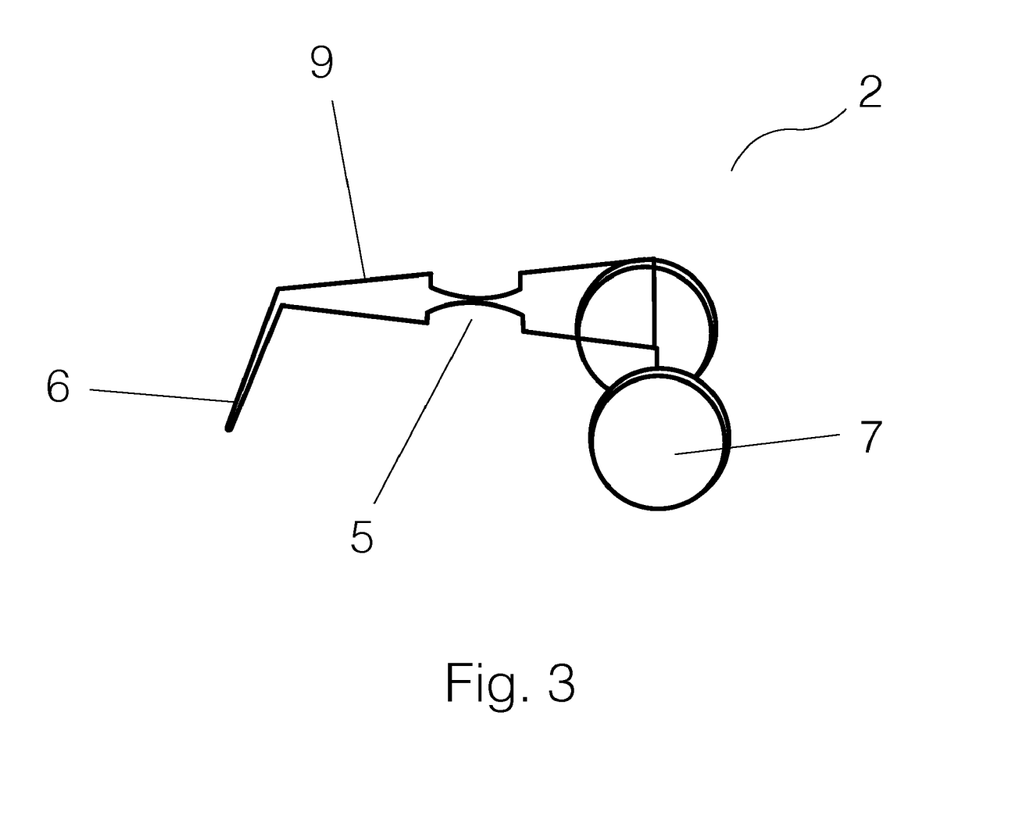
FIG. 3 is a perspective view of a two-wheel chassis of the shopping bag according to a first embodiment of the invention.
Figure 4:
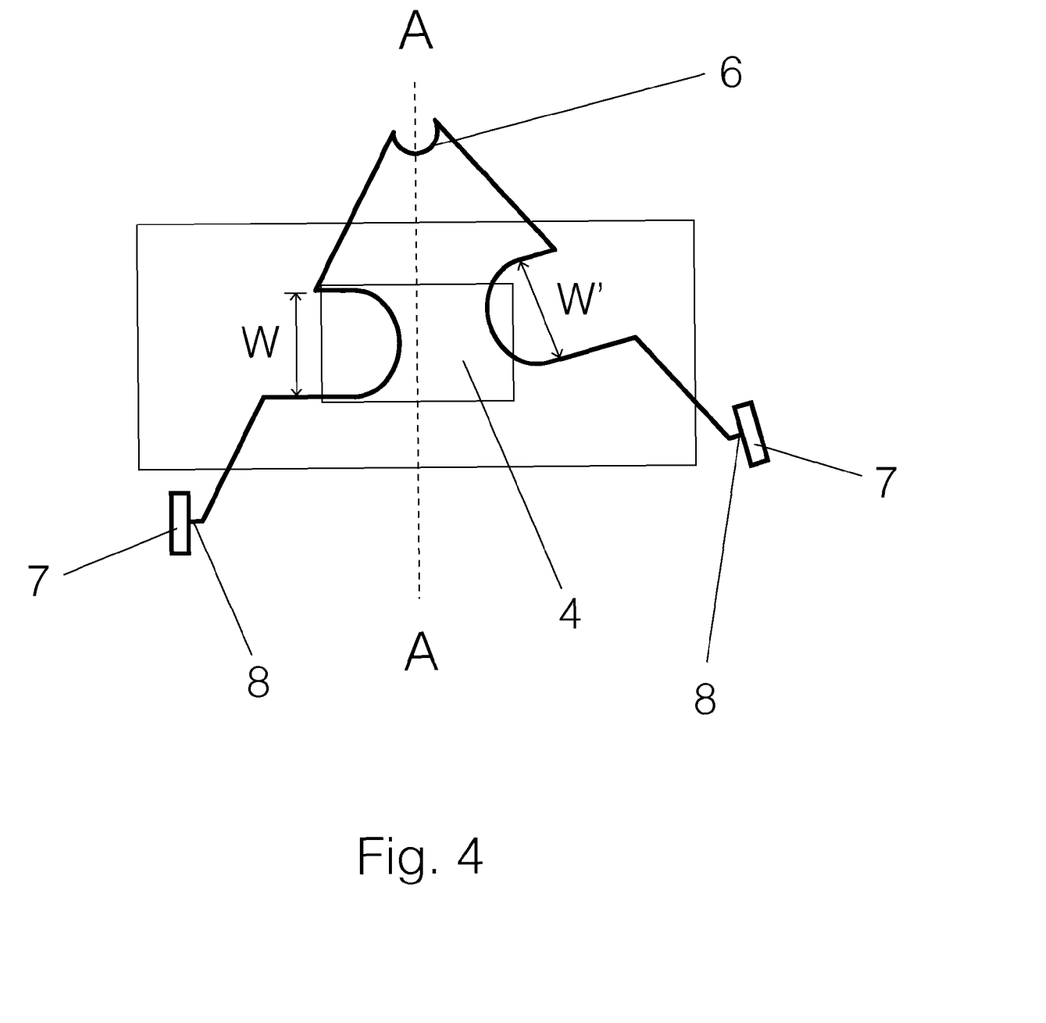
FIG. 4 is a bottom view of the shopping bag, showing that one inserting portion has been inserted into the receiving portion while the other inserting portion is going to be inserted into the receiving portion.
Figure 5:
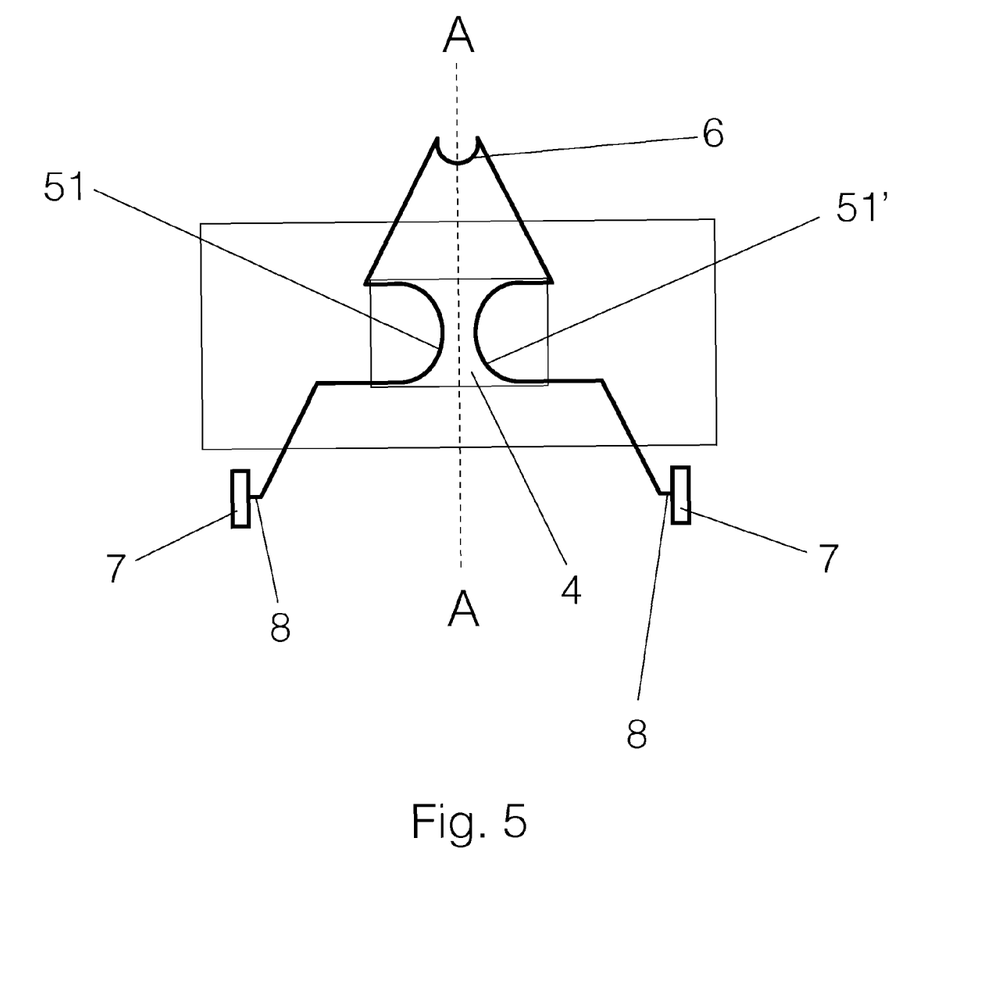
FIG. 5 is a bottom view of the shopping bag, showing that the two inserting portions have already been inserted into the receiving portion.

With reference to FIGS. 3-5, the two-wheel chassis 2 constructed according to a first embodiment of the invention is made of a piece of resilient metal wire. In this embodiment, iron wire is selected as the metal wire. It would be apparent that other metal wires or metal alloy wires, such as stainless steel wire or PVC-coated wire, are possible. In particular, the iron wire is folded to have a generally V-shaped configuration, which comprises two free end portions and a tip end portion where a convex supporting portion 6 is formed by downwardly curving the tip end portion. The height of the supporting portion 6 may be determined by the size of the wheels 7 at the two free end portions. In accordance with the present invention, inserting portions 5 are formed in the middle part of the V-shaped iron wire by oppositely and inwardly curving the iron wire. It is understood that the oppositely and inwardly insertion portions 5 can be of rectangular configuration. Each of the inserting portions 5 comprises an inserting member 51 or 51' which is shaped and sized to be received in the receiving portion 4. The two inserting members 51 and 51' are symmetrical about a central line A-A of the V-shaped iron wire, and the inserting members 51 and 51' have a width less than the insert-receiving member. Then, two connecting elements 8 configured as two rigid axles are formed by downwardly and outwardly curving the free end portions of the V-shaped iron wire, and a pair of wheels 7 are rotatably mounted on the connecting members 8 by a method known in the prior art, such as by using screws and nuts or glue plastic cap. Preferably, the length of the two-wheel chassis 2 between the supporting portion 6 and the connecting member 8 is 25 cm-30 cm.

In the case of a shopping bag of bigger size, the existing technology always requires preparation of a different wheel chassis to suit this bigger shopping bag. Therefore, a large number of wheel chassis of different sizes should be provided to suit for the shopping bags of different sizes. It is known by far that there does not exist such a wheel chassis which can be altered in its size.

The wheel chassis of the invention does not have this problem because of the resilient characteristic of the metal wire. According to the invention, the wheel chassis is designed such that the chassis of one standard size would be able to fit many bags having a bottom of different sizes, because a standard size insert-receiving member can be affixed to shopping bags of different sizes.

FIGS. 4 and 5 further illustrate how the inserting portions 5 are inserted into the receiving portion 4 of the bag body 1. First, insertion of one of the inserting members 51 and 51' from one open end of the insert-receiving pocket 41 into the insert-receiving pocket 41 is implemented, and then the other inserting member 51 or 51' is outwardly splayed to the extent that it fits to be inserted into the insert-receiving pocket 41 from the other open end of the insert-receiving pocket 41. Generally, the inserting members 51 and 51' are sized and shaped such that these inserting members are snugly inserted into the receiving portion without the need of additional fastening therebetween. This ensures the avoidance of use of any fastening mechanism such as Velcro mechanism to fasten the inserting portions 5 and the receiving portion 4, which is commonly found in the prior art, while the wheel chassis is not disengaged from the receiving portion 4. Such a design also ensures that a relative displacement between the inserting portions 5 and the receiving portion 4 would not occur.

Figure 6:
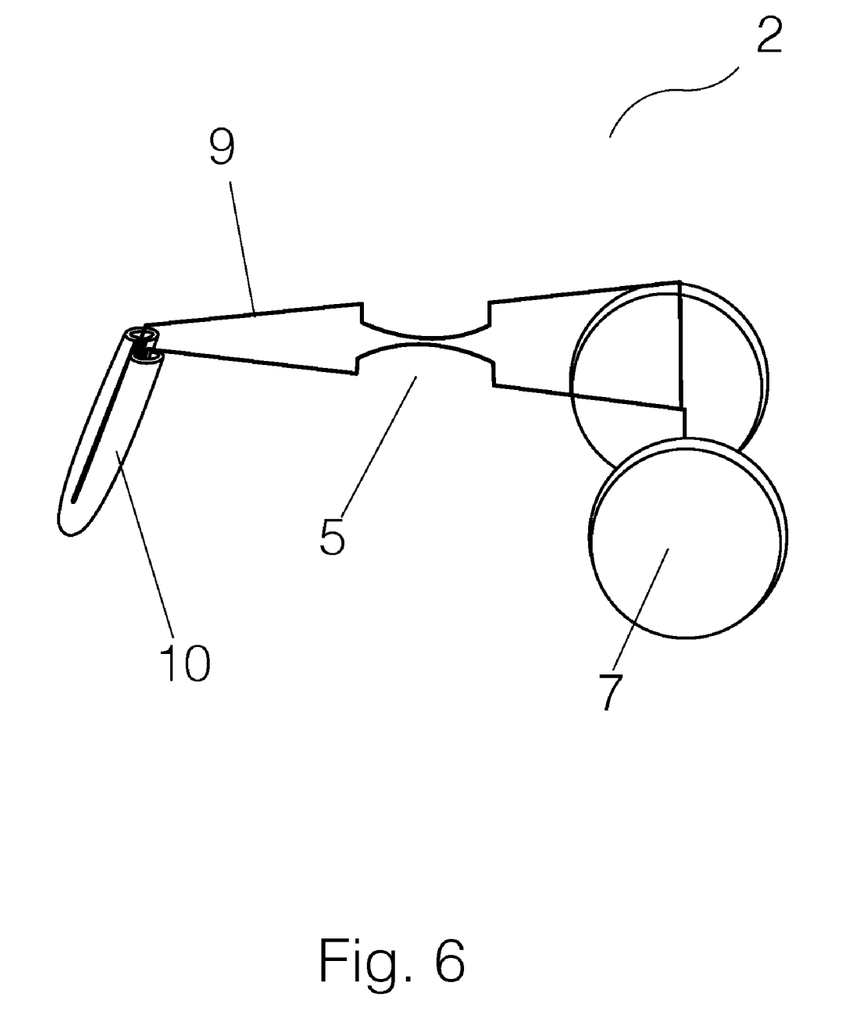
FIG. 6 is a perspective view of the two-wheel chassis of the shopping bag having a plastic layer wrapped onto the supporting portion.

With reference to FIG. 6, the supporting portion 6 of the chassis advantageously has a plastic layer 10, in order to prevent a smooth floor from being scratched. The plastic layer may be made of PVC. Of course, use of any other materials such as foam, plastic such as PP and PE is possible.

The V-shaped iron wire further comprises a remaining portion 9 which serves in combination with the inserting portions 5 to support the bag body 1 and the cargoes contained therein.

After the insertion of the inserting portions 5 into the receiving portion 4, the shopping bag of the invention can be dragged to move along the floor. The shopping bag is maintained immovable even on a smooth floor if the convex supporting portion 6 and the two wheels 7 are in the same plane.

Figure 7:
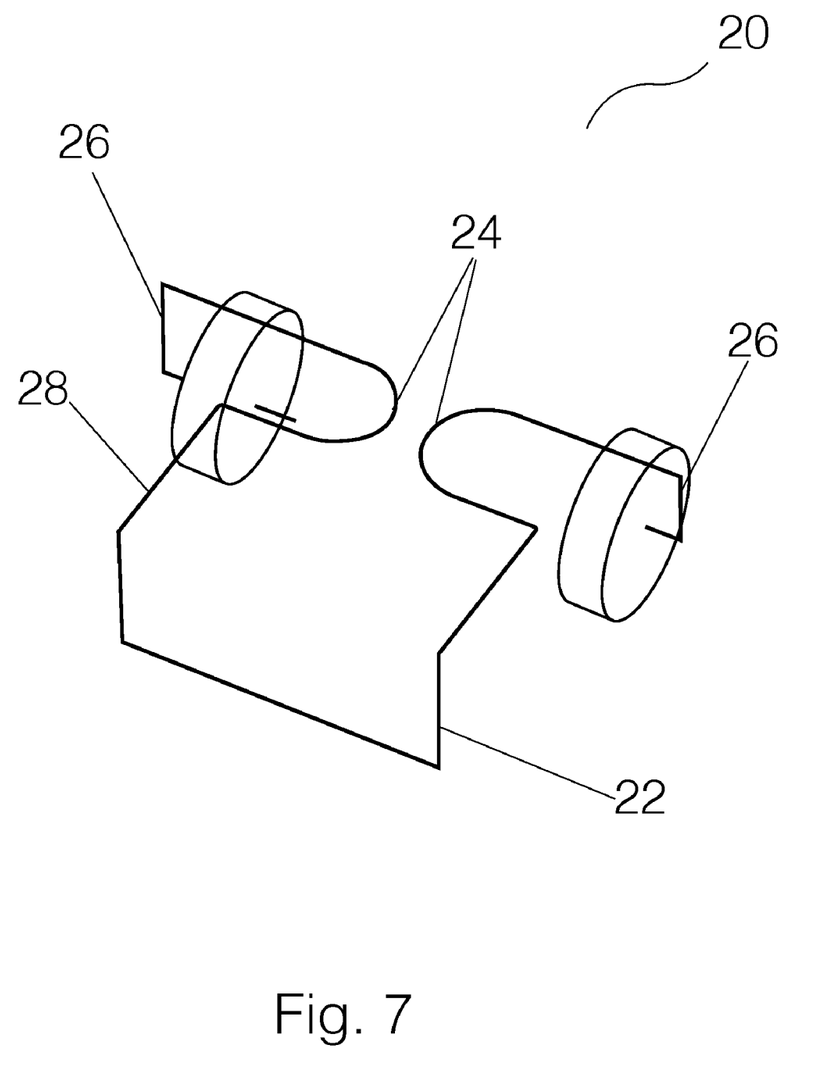
FIG. 7 is a perspective view of a two-wheel chassis of the shopping bag according to a second embodiment of the invention.

FIG. 7 illustrates a two-wheel chassis 20 of the shopping bag according to a second embodiment of the invention. In this embodiment, the two-wheel chassis 20 is also made of a piece of resilient metal wire which is folded to have a substantially rectangular configuration. In particular, the two-wheel chassis 20 has a downwardly extended supporting portion 22 of rectangular shape, two oppositely and inwardly curved inserting portions 24, and two downwardly and inwardly extended end portions 26 on which the two wheels are rotatably mounted. The two-wheel chassis 20 further comprises a remaining portion 28 which serves in combination with the inserting portions 24 to support the bag body and the cargoes contained therein.

Figure 8:
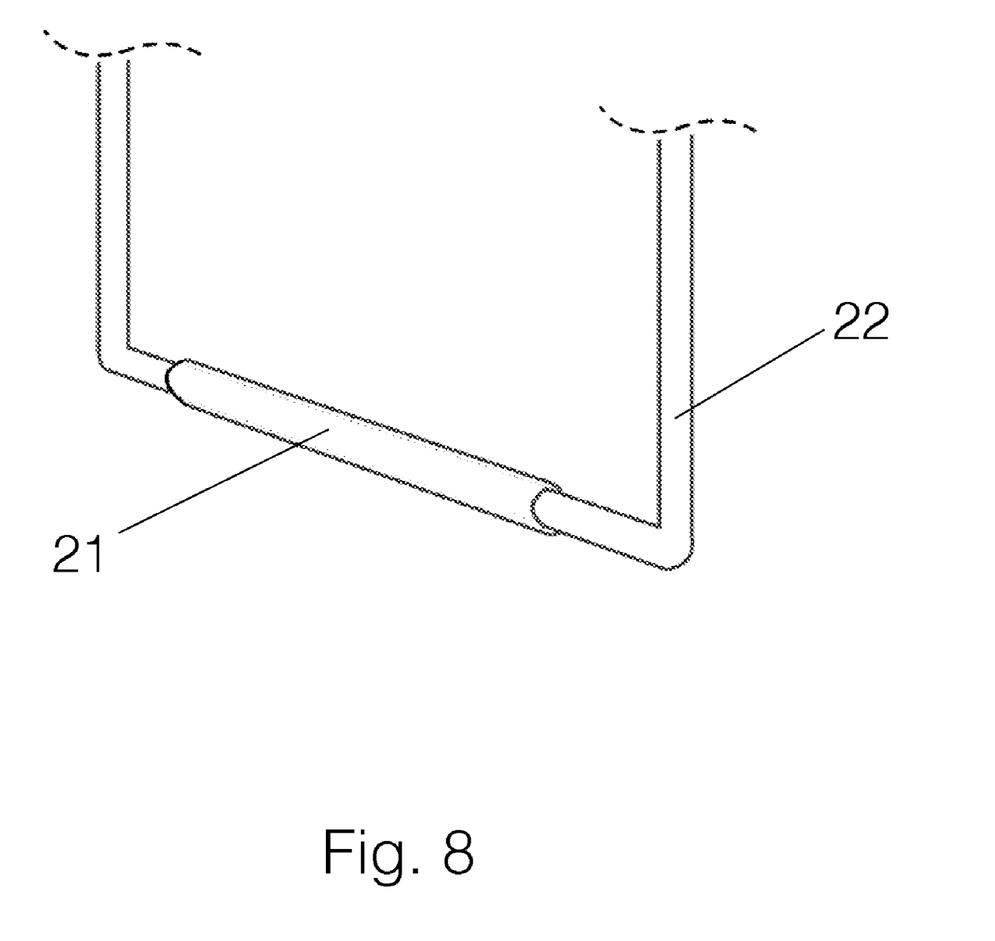
FIG. 8 is a perspective view of the supporting portion of FIG. 7 showing a plastic tubing is sleeved on the supporting portion.

FIG. 8 illustrates that the supporting portion 22 of the chassis 20 is sleeved with a plastic tubing 21, which provides the same function of preventing a smooth floor from being scratched as done by the plastic layer 10 of the first embodiment above. Generally, the plastic tubing 21 is pre-sleeved onto the resilient metal wire before it is bent to form the supporting portion 22. Of course, use of any other materials such as foam is possible for the tubing 21.

This two-wheel chassis 20 of the second embodiment is similar in use and operation to that disclosed in the first embodiment.

It would be appreciated that the two-wheel chassis according to the invention is applicable not only to a shopping bag, but also to an article having a relatively flat bottom, such as a container, a box or a backpack.

It is understood that many other embodiments of the present invention are also possible, and many corresponding modifications as well as variations can be made by those skills in the art as according to the disclosure of the present invention and without departing from the spirits and essentials thereof, while such modifications and variations fall into the scope of the claims of the present invention.

What is claimed is:

1. A shopping bag with a detachable wheel chassis, comprising:
    a bag body having bag handles and a receiving portion disposed on a bottom thereof; and
    a two-wheel chassis detachably configured to bear and hold the bag body thereon, wherein the chassis is made of a piece of resilient metal wire that is folded to form a configuration having a downwardly extended supporting portion, two oppositely and inwardly inserting portions adapted to be received in the receiving portion of the bag body, and two end portions on which the two wheels are rotatably mounted.

2. The shopping bag according to claim 1, wherein the receiving portion is an insert-receiving member fixed onto the bottom of the bag body.

3. The shopping bag according to claim 2, wherein the insert-receiving member is fixed onto the bottom of the bag body through an adhesive or in a sewing manner.

4. The shopping bag according to claim 3, wherein the insert-receiving member is fixed to shopping bags of different sizes such that the chassis of one standard size is used to carry these shopping bags of different sizes.

5. The shopping bag according to claim 1, wherein the resilient metal wire is made of steel, iron, other metal material or other metal alloy material.

6. The shopping bag according to claim 1, wherein the resilient metal wire is coated with a layer of PVC.

7. The shopping bag according to claim 1, wherein
    the configuration formed of the folded piece of resilient metal is substantially V-shaped,
    the downwardly extended supporting portion is convex,
    the two oppositely and inwardly inserting portions are curved, and
    the two end portions on which the two wheels are rotatably mounted are downwardly and outwardly extended.

8. The shopping bag according to claim 1, wherein the configuration formed of the folded piece of resilient metal is substantially rectangular,
    the downwardly extended supporting portion is in a rectangular shape,
    the two oppositely and inwardly inserting portions are curved, and
    the two end portions on which the two wheels are rotatably mounted are downwardly and inwardly extended.

9. The shopping bag according to claim 1, wherein a plastic layer is wrapped onto the supporting portion.

10. The shopping bag according to claim 9, wherein the plastic layer is made of PVC.

11. The shopping bag according to claim 1, wherein a plastic or foam tubing is sleeved on the supporting portion.

12. A shopping bag with a detachable wheel chassis, comprising:
    a bag body having bag handles and a receiving portion disposed on its bottom; and
    a two-wheel chassis detachably configured to bear and hold the bag body thereon, wherein the chassis is made of a piece of resilient metal wire and has a configuration having a downwardly extended supporting portion, two oppositely and inwardly inserting portions adapted to be received in the receiving portion of the bag body, and two end portions on which the two wheels are rotatably mounted, wherein
    the receiving portion is an insert-receiving member fixed onto the bottom of the bag body, and
    the receiving portion defines a receiving space between a part of the bottom of the bag body and the insert-receiving member to form an insert-receiving pocket with two open ends for receiving the inserting portions of the chassis.

13. The shopping bag according to claim 12, wherein the inserting members are shaped and sized so as to be received in the insert-receiving pocket.

14. A two-wheel chassis detachably configured to bear and hold an article having a relatively flat bottom and a receiving portion on the relatively flat bottom, wherein the chassis is made of a piece of resilient metal wire that is folded to form a configuration having a downwardly extended supporting portion, two oppositely and inwardly inserting portions adapted to be received in the receiving portion of the article, and two end portions on which the two wheels are rotatably mounted.

15. The two-wheel chassis according to claim 14, wherein the resilient metal wire is made of steel, iron, other metal material or other metal alloy material.

16. The two-wheel chassis according to claim 14, wherein the resilient metal wire is coated with a layer of PVC.

17. The two-wheel chassis according to claim 14, wherein the receiving portion is fixed to articles of different sizes such that the chassis of one standard size is used to carry these articles of different sizes.

18. The two-wheel chassis according to claim 14, wherein
the configuration formed of the folded piece of resilient metal is substantially V-shaped,
the downwardly extended supporting portion is convex,
the two oppositely and inwardly inserting portions are curved, and
the two end portions on which the two wheels are rotatably mounted are downwardly and outwardly extended.

19. The two-wheel chassis according to claim 14, wherein
the configuration formed of the folded piece of resilient metal is substantially rectangular,
the downwardly extended supporting portion is in a rectangular shape,
the two oppositely and inwardly inserting portions are curved, and
the two end portions on which the two wheels are rotatably mounted are downwardly and inwardly extended.

20. The two-wheel chassis according to claim 14, wherein a plastic layer is wrapped onto the supporting portion.

21. The two-wheel chassis according to claim 14, wherein a plastic or foam tubing is sleeved on the supporting portion.

* * * * *